March 9, 1954 W. H. VAN BENSCHOTEN 2,671,285
DISPLAY DEVICE
Filed Aug. 9, 1949 5 Sheets-Sheet 2
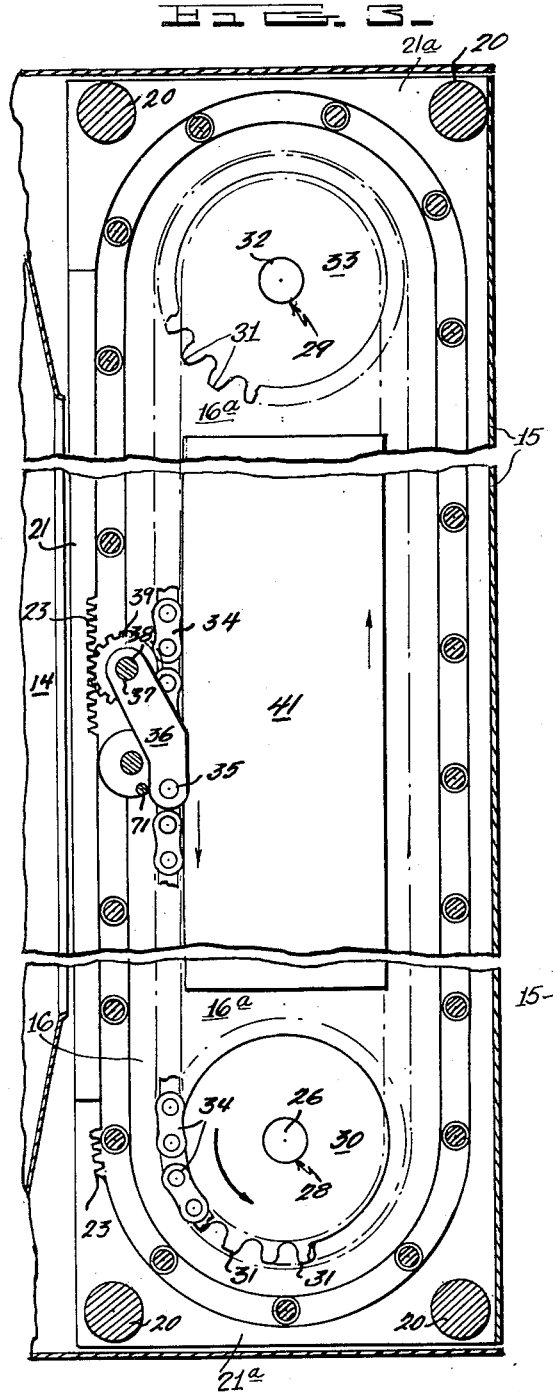
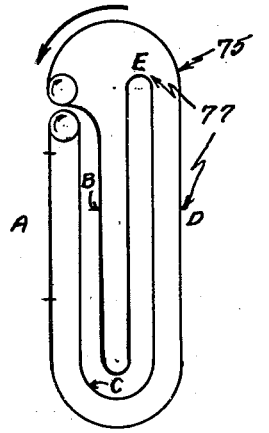
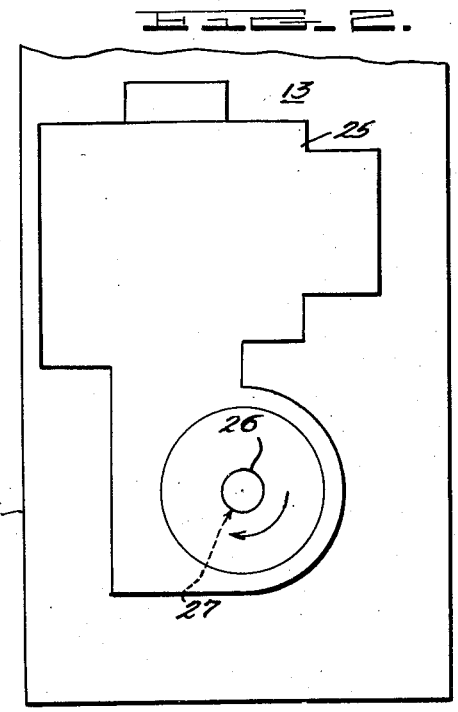
INVENTOR.
WILLIAM H. VAN BENSCHOTEN
BY
Semmes Keegin Robinson & Semmes
ATTORNEYS

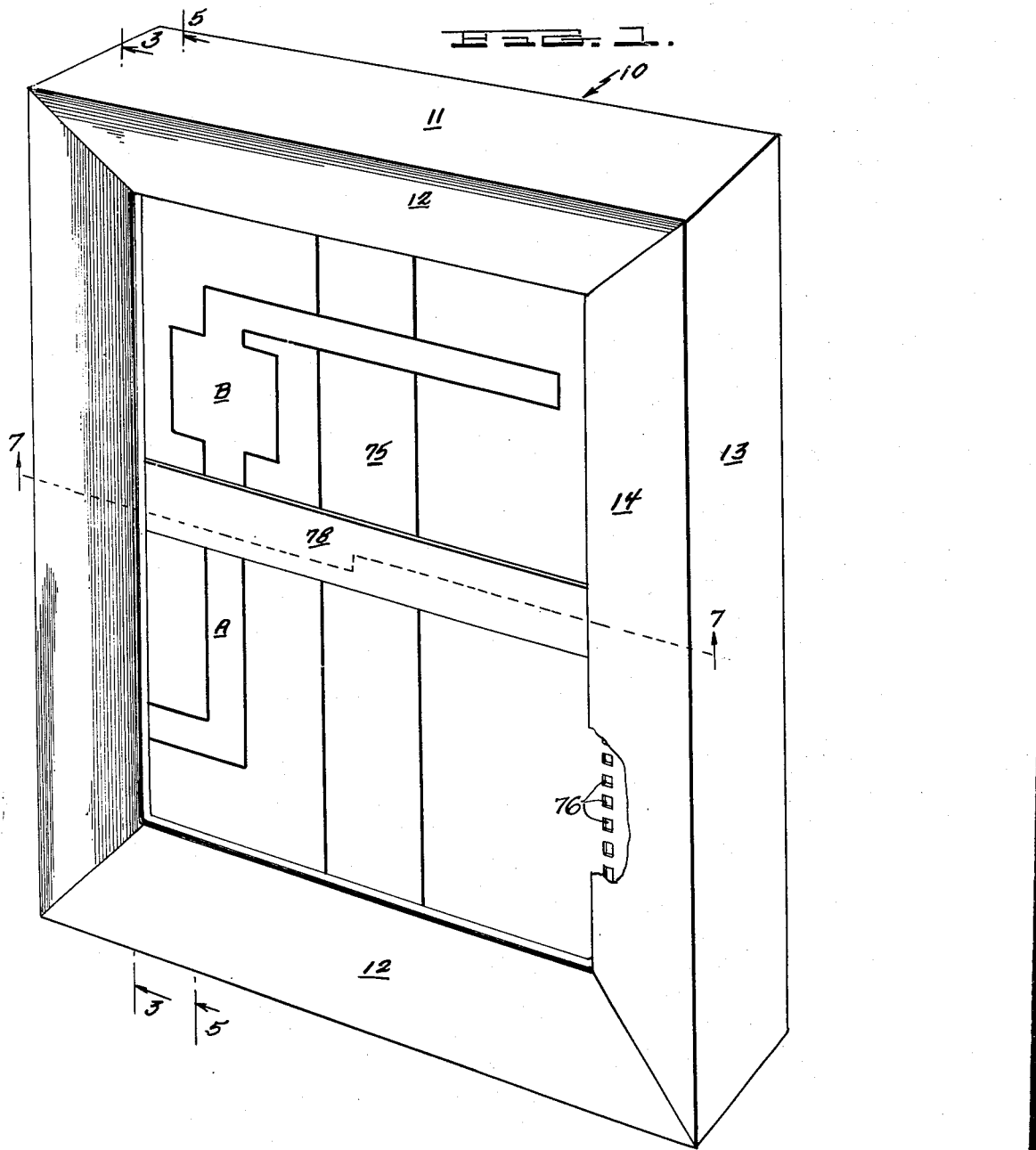

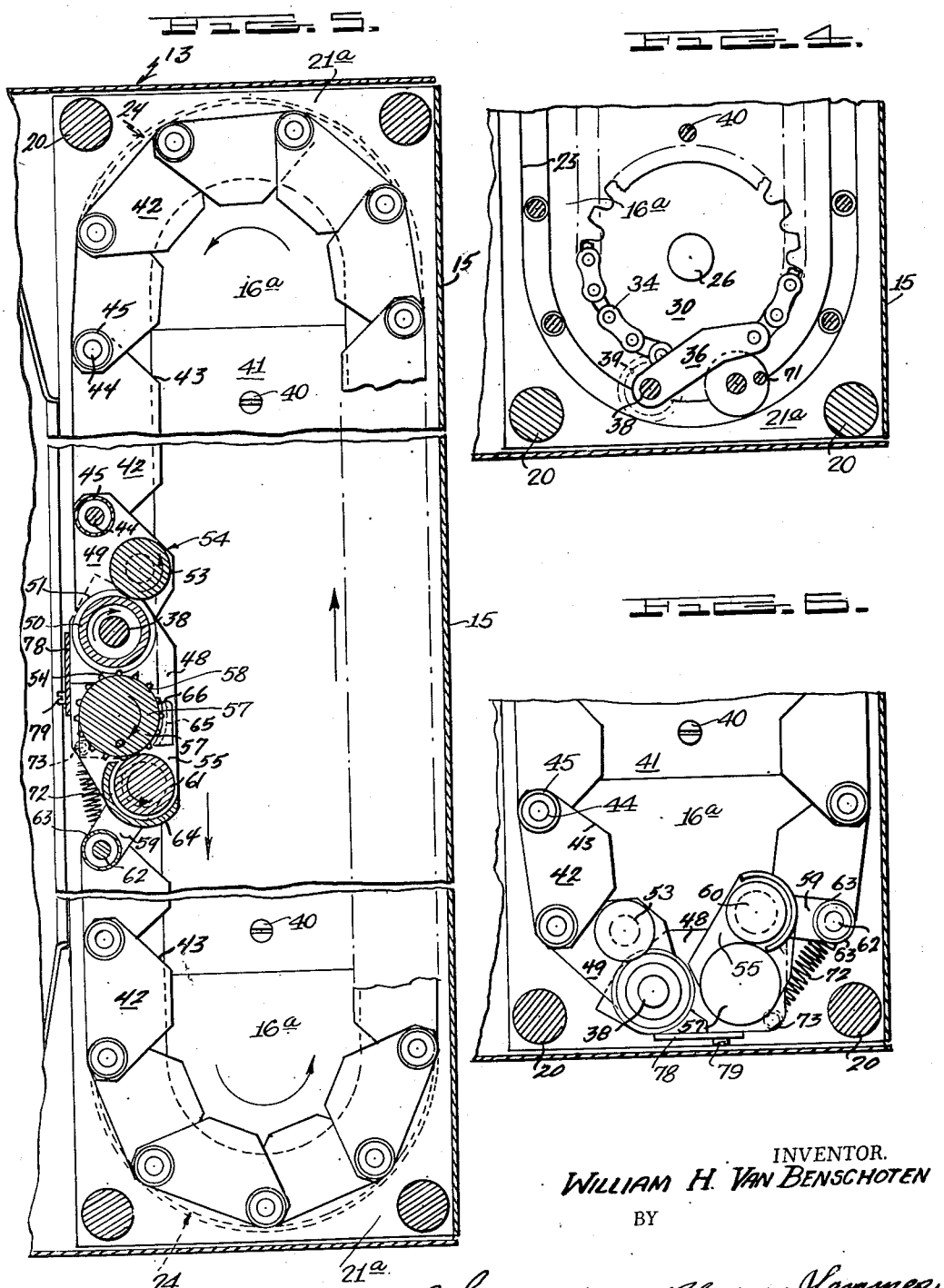

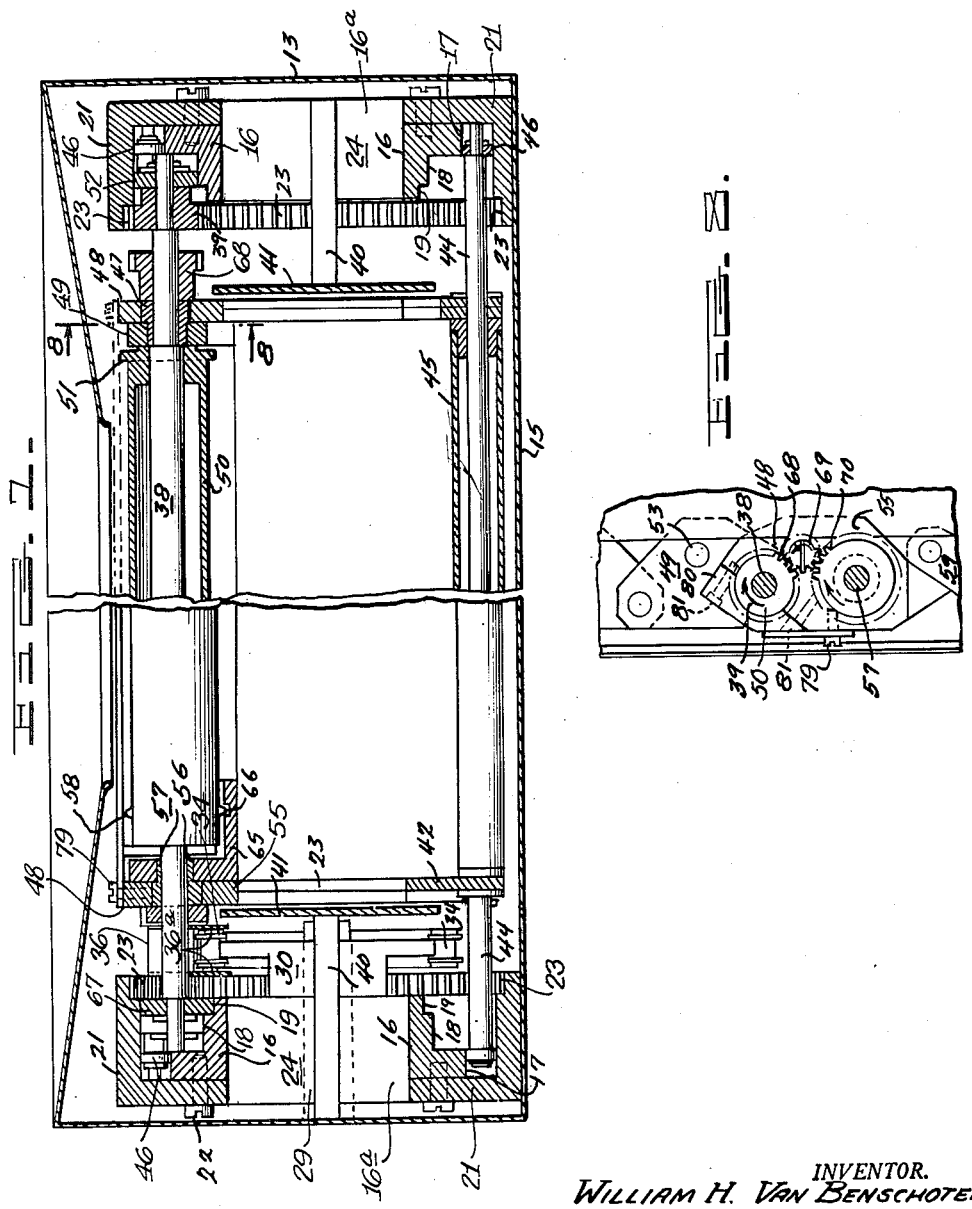

March 9, 1954 W. H. VAN BENSCHOTEN 2,671,285
DISPLAY DEVICE
Filed Aug. 9, 1949 5 Sheets-Sheet 5

INVENTOR
WILLIAM H. VAN BENSCHOTEN
BY
ATTORNEYS

Patented Mar. 9, 1954

2,671,285

UNITED STATES PATENT OFFICE 2,671,285

DISPLAY DEVICE

William H. van Benschoten, West Park, N. Y.

Application August 9, 1949, Serial No. 109,247

9 Claims. (Cl. 40—32)

This invention relates to display devices and has particular reference to machines for successively displaying frames of graphic representations.

A number of devices have been created in the art for successively displaying graphic representations and for creating the optical illusion of elision of graphic representations one into another. To create this illusion, machines have been provided wherein series of sheets are unrolled and subsequently gathered to bring a representation into and out of view and to thereby create the illusion that a primary representation elides into a secondary representation. However, none of the devices hitherto known in the art is capable of creating the desired optical illusion through the use of a unitary web having preselected series of embossed graphic representations, wherein a single carriage element simultaneously expends and gathers increments of the web containing the representations. The advantages of this innovation over the prior art will appear obvious from the following objects, general description, drawings and appended claims, wherein reference to numerals on the drawings has reference to like elements described.

It is an object of this invention to provide a machine for the successive display of graphic representations in the same plane and within predetermined confined borders so that after the last representation is displayed, the first shall next appear to successively obliterate the last.

It is a further object of this invention to provide a machine for affecting the change of graphic representations by progressive replacement of a first representation by a second while maintaining any given reference point stationary in either representation so long as it remains visible to an observer.

Yet another object of the invention is to provide a device for displaying graphic representations wherein the observer sees the movement of a relatively narrow band periodically moving across the surface of a framed picture, the movement apparently causing the picture initially displayed to disappear under the narrow band while a succeeding picture appears in the wake of the narrow band.

Still another object of the invention is to display representations which have a significant relationship for educational or advertising purposes, for example to initially display representations of interior of a mechanism and successively to display cross sectional representation of the same mechanism at progressively deeper planes or to display an object of manufacture for advertising purposes with an initial background successively followed by changing and variable backgrounds.

Yet another object of the invention is to provide a machine for successively displaying graphic representations having a single carriage element wherein a series of graphic representations embossed on a unitary web may be successively displayed, the peculiar and simplified structure of which enables reduction of problems of maintenance and replacement hitherto troublesome in the art.

Still another object of the invention is to provide means for the successive and continuous display of representations having minimum number of working elements enabling facility and economy of manufacture.

In general, the device consists of a rectangular frame housing adapted to display a web, to contain a movable carriage for the web and to contain supports and guides for the carriage. In order to present a desired illusion, graphic representations are embossed on a unitary web sheet in preselected sequence. A movable carriage for the web is provided. The carriage is adapted to carry the web across a frame opening in the rectangular housing. Across the frame opening, portions of the web are simultaneously gathered and added and the representations appear to elide into one another. In actual operation, the carriage element may be moved in a counterclockwise direction. The direction of movement of the carriage element itself, together with the opposed clockwise movement of web rollers disposed in the carriage element, is coordinated so that as web increments are simultaneously gathered and added, portions of the web exposed in the frame, do not move with relation to the rectangular frame housing. The effect is that the observer sees one or more series of graphic representations on the web on an equal plane, the center of focus of each said representation being adjacent the other. As the carriage element simultaneously gathers and adds, the observer's optical senses perceive that the graphic representations appear to move one into the other.

One of the more important features of the invention resides in the relative simplicity of structure. Although a similar effect has been accomplished by other devices in the art, none of the machines hitherto employed has utilized a single carriage element suitable for gathering and adding increments of a single web element whereon a series of graphic representations are embossed.

For purposes of clarity, the invention will be more readily defined and understood by reference to the following description and accompanying drawings wherein reference to numerals on the drawings has reference to the elements described.

In the drawings:

Figure 1 represents a view in perspective as the device appears to an observer;

Figure 2 is a fragmentary view in side elevation of a conventional driving means and gear reduction unit located on the left side of the device;

Figure 3 is a vertical cross sectional view of the device taken along the lines 3—3 of Figure 1;

Figure 4 is a vertical cross sectional view in fragment taken along the lines 3—3 of Figure 1 and illustrating the lower arcuate travelling elements of the device;

Figure 5 is a vertical cross sectional view taken along the lines 5—5 of Figure 1 showing detailed structure of the carriage;

Figure 6 is likewise a vertical cross sectional view in fragment of the carriage structure of Figure 5 as it rides in arcuate section of the housing;

Figure 7 is a horizontal cross sectional view of the device taken along broken line 7—7 of Figure 1;

Figure 8 is a vertical fragmentary cross sectional view of the carriage element taken along the lines 8—8 of Figure 7;

Figure 9 is a diagrammatic view of the web showing path of movement of carriage, system of withdrawal and paying out, and graphic representation sequence on the web;

Figures 10, 10A, 11:
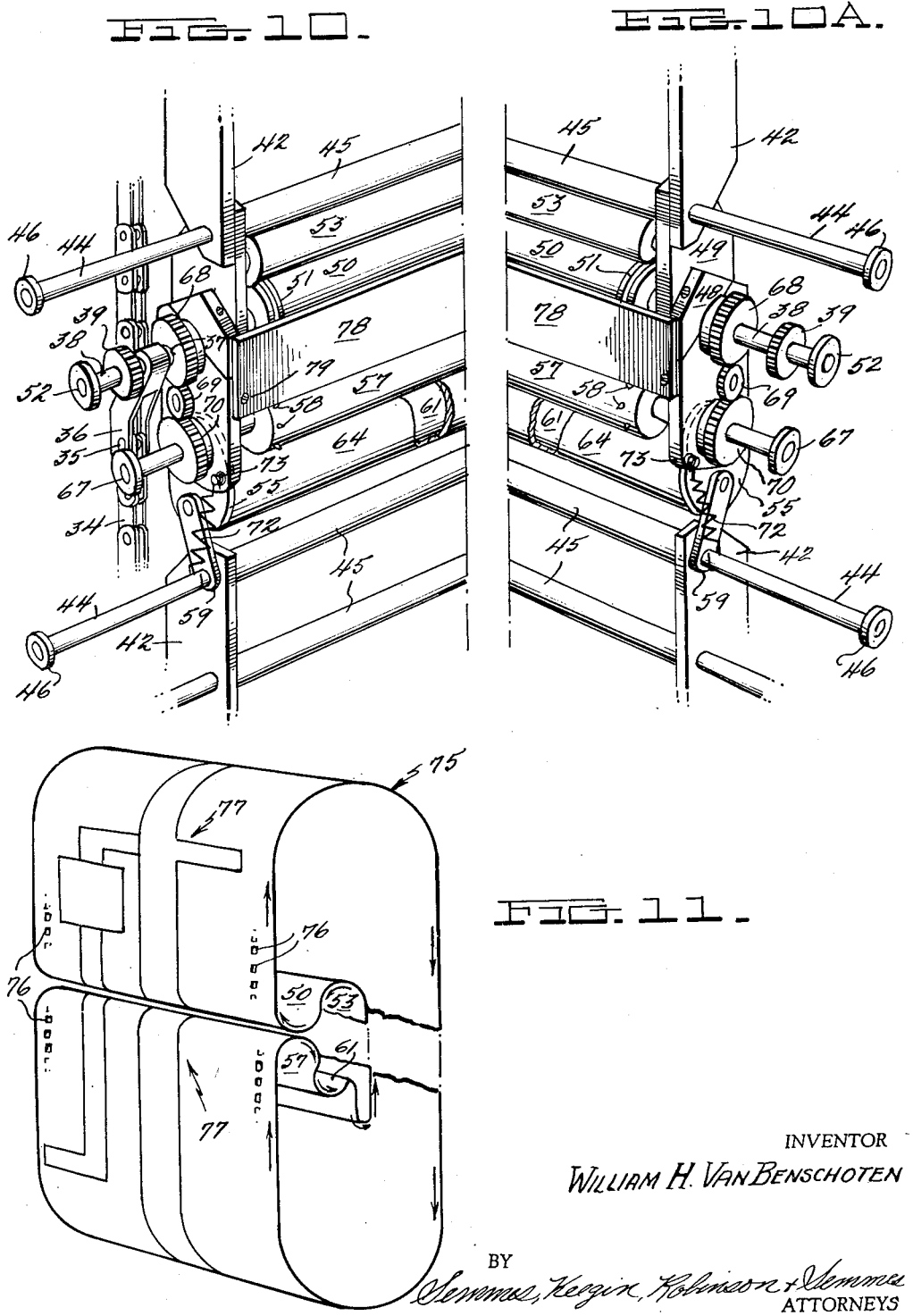
Figure 10 is a view in fragmentary perspective of the left side of the carriage showing cooperative disposition of working elements of the carriage.
Figure 10a is a view in fragmentary perspective of the left side of the carriage.
Figure 11 is a fragmentary diagrammatic front view of the folded web of Figure 1.

As shown in Figure 1, the device comprises a housing having pairs of opposed transverse closure members 11 and 12. The members 12 are disposed angularly inwardly of the members 11, in order that the illusion of depth may be effected to a screen of the device. Secured to and at right angles to members 11 and 12 are pairs of opposed vertical closure members 13 and 14 disposed on either side of the structure and in similar angular relation to the transverse members. The pairs of transverse and vertical members are joined to form a frame. The housing 10 consisting of transverse elements 11, 12 and 13, 14 may be attached to a rigid base 15 by conventional means. See Figures 3 and 5. The housing may be made of any suitable material such as a light metal alloy or plastic.

Internally of the housing 10, two parallel pairs of supports 16 extend vertically of the housing and are shown secured each-to-each at their ends by transverse rods 20 in Figures 3, 4 and 5. From front to rear, supports 16 are joined by spacers 16a best shown in Figures 5 and 7. A sectional view of supports 16 is shown in Figure 7. Each of these supports 16 provide a substantial foundation for graduated series of guide shoulders 17, 18 and 19. Internal extremities of base supports spacers 16a define graduated arcs 24 for the endless continuation of guide shoulders 17, 18, and 19. See Figures 5 and 7.

Covers 21 run parallel and are secured to the supports 16 by screw means 22 as shown in Figure 7. Covers 21 are joined from front to rear by terminal blocks 21a. These covers 21 provide foundation for racks 23 which are opposed and parallel to graduated shoulders 17, 18 and 19. The terminal blocks 21a have arcuate sections 24 formed therein for continuation of the path formed by covers 21. Racks 23 are cut into the covers 21 and spacers 21a so that a continuous path may be provided vertically upwardly and downwardly of the device. Similarly, spacers 16a define arcuate shoulders for continuation of the parallel paths formed in the supports 16.

Fixedly engaged with side member 13, and at the lower end thereof, is a driving source 25 being any conventional electric motor and having a suitable gear reduction unit therein. As shown in Figure 2, power is preferably transmitted in clockwise direction from this source to a drive shaft 26 through bearing surfaces 27 of wall 13 and spacer 16a to drive wheel 30. Drive wheel 30 has spaced teeth 31 at its periphery suitable for engaging chain links 34 of an endless chain. See Figure 3. At the upper extremity of the frame structure is an idler wheel 33 bearing on axle 32, the axle being journalled in spacer 16a as at 29. This idler also is given teeth 31 at its periphery for engaging the chain elements.

Attached to chain 34 is a pin 35 designed to engage a draw link 36. Referring to Figure 3, this draw link projects angularly outward of the chain 34 and has a bushing 37 at its upper extremity for engaging a shaft 38 to which a horizontal roller is fixedly engaged. As draw link 36 moves by chain in straight section of a circuit, non-axial pull on the chain from closest working tooth 31 through pin 35 to shaft 38 causes outward whipping of the chain and connected elements. This whipping is counteracted by a horizontal stud 71 fixed to an inner riding linkage element 55 hereinafter described. As the draw link 36 moves in arcuate section of circuit, pull of the draw link is effected tangent to the pitch line of sprocket 30 due to forced seating of outwardly protruding bushing 37 of draw link 36 on a link jointure of the roller chain 34 illustrated in Figure 4. Shaft 38 is provided with external teeth 39 adapted to engage internal gear racks 23.

As best shown in Figure 7, pins 40 fit into spacers 16a. These pins provide horizontal support for shield plates 41 extending longitudinally of the frame structure parallel to supports 16. The shields are designed to prevent folds of web sheeting from entanglement in the working parts of the device and also to provide protection of roller chain elements 34 from chafing a connected series of linkage elements 42 riding inwardly of the chain elements 34.

A movable structure comprising a series of linkage plates 42 having tapered flanges 43 and joined together by rigid shafts 44 and web support rollers 45, Figures 5 and 10, is disposed inwardly of the chain 34. This movable structure conforms in circuit to the chain element so that a line drawn by the moving axes 44 of any of the support shafts would define a circuit parallel at all points to the path of the circuit of chain 34. The purposes of this linkage structure are to movably support a graphic web, and to provide movable housing for carriage elements designed to simultaneously gather and pay out increments of a web. Tandem rollers 46 are secured by conventional means to ends of shafts 44. These rollers 46 are designed to ride in guide recesses 17 of support 16 as shown in Figure 7. As shown in Figure 3, counterclockwise actuation of chain 34 through its course will cause similar circuitous movement of the linkage structure through its parallel circuit, the movement of the latter being effected by draw link connection with carriage structure.

Shaft 38 bears in bushings 47 which in turn have bearing in connecting carriage links 48, Figures 5, 7 and 8, and have pressed fit in trailing carriage links 49. The shaft is guided by rotation of a roller rotatably engaging its extension for movement as on shoulder 18.

Shaft 38 extends substantially the entire horizontal width of the device and rotatably supports pay-out roll 50 as shown in Figures 5, 7 and 10. Shoulders 51 are disposed inwardly of the carriage links 48 and 49 and circumferentially of the pay-out roll 50. These shoulders at ends of roller 50 provide a directional guide for a web, the width of which extends up to the inner edges of the shoulder. Outwardly of connecting carriage links 48 and 49 and at an end of shaft 38 are gears 39. Gears 39 of shaft 38 mesh with racks 23 and as the carriage element moves with the linkage elements counterclockwise as shown in Figure 3, clockwise rotation is imparted to the shaft 38, and pay-out roll 50. These gears 39 maintain contact with internal racks 23 since roller guides 52 of the shaft supportingly ride in recessed guides 18 in Figure 7.

Pay-out idler roll 53 is disposed rearwardly of pay-out roll 50. This idler roll bears in trailing carriage links 49 as at 54 in Figure 10 and extends horizontally of the frame structure. In operation this idler roll rotates counterclockwise at the same speed as pay-out roll 50 rotates clockwise. (See Figure 5.)

Carriage links 48 secure bushings 56 shown in Figure 7. These bushings also have pressed fit in leading carriage links 55 and provide bearing surfaces for a sprocket roll 57 as shown in Figure 5. The sprocket roll 57 carries rings of sprocket teeth 58 near ends of the roll. These teeth are conveniently spaced to accommodate conveniently spaced film perforations. Thus spacing of the teeth for standard 35 millimeter film would be at .002 inch less than spacing of perforations. Creeping of the web over the sprocket roll may be effected in this manner. Forwardly of the sprocket roll 57 and bearing in elbow link 59 and forward carriage links 55 is a shaft 60 extending horizontally of the frame structure parallel to the aforementioned shafts which bear rollers. Sprocket idler roll 61 is keyed to shaft 60. Likewise, shaft 62 of leading support roll 63 bears in the other extremity of elbow link 59. All external rolls in carriage structure, namely 50, 57 and 63, together with support rolls 45 may be tangent to a common plane, so-called picture plane at their outer circumferences. This plane may, however, vary from flat to gradual arc in accordance with demands of picture base. Likewise, all rolls in carriage and support structure, except the idler rolls, will have an outer circumference tangent to a common imaginary cylinder concentric with arcuate portions of guide recesses 17, 18 and 19.

Leading carriage links 55 are joined transversely of the frame structure by a stripping shield 64, the said stripping shield being attached to the leading carriage links 55 by any suitable means, such as welding. These leading carriage links 55 serve the purpose of supporting web guides 65 disposed inwardly of the sprocket 57. Web guides 65 have close clearance against sprocket roll 57. In order to allow clearance of teeth 58 of the sprocket roll, the web guides 65 are provided with arcuate recesses 66, as in Figure 7. From the drawings, Figs. 5 and 11, it is shown that the web passes over sprocket roll 57 between sprocket roll 57 and web guide 65 and in a counterclockwise direction between the idler roll 61 and stripping shield 64.

As shown in Figure 5, shafts 44 carry rollers 45. Upon movement of the carriage element, these rollers will rotate in a clockwise direction under the web as the carriage element moves counterclockwise since the web will remain substantially stationary with respect to the device as a whole. The ends of shafts 44 have rollers 46 disposed externally of links 42. These rollers 46 run in recessed guides 17 as shown in Figure 7. As indicated, shaft 38 carries at its lateral extremities similar rollers 52 disposed laterally outside of gear 39 which run in recess guides 18 longitudinally and arcuately of the frame structure. Likewise the shaft of sprocket roll 57 has at its lateral extremities a similar pair of rollers 67 which ride in shoulders 19 inwardly of the aforementioned shaft extension rollers 52. The recessed guides 17, 18 and 19 provide bearing surfaces for the roller extensions and by vertical and arcuate movement of the rollers throughout the frame structure generally oblong elliptical movement guiding is effected.

Differences in radii of center axes of arcuate sections of recessed guides 17, 18 and 19 necessitate reduction in axis spacing between rollers running in the respective guides. To compensate for the phenomenon, elbow articulation is effected between leading carriage link 55 and elbow link 59 pivoting on shaft 60 of idler roll 61. Any slack occurring on running in arcuate section between support and carriage elements is absorbed by tension springs 72 from stud 73 of leading link 55 to shaft 62 as best shown in Figure 6.

Outwardly of connecting carriage link 48, and between gear 39 and the link and keyed to shaft 38, is gear 68. This gear 68 has external gear engagement with an external pinion gear 69 disposed inwardly of the axis of gear 68 and bearing in link 48. See Figures 8, 10 and 10a. According to Figure 10 rotation of gear 68 is effected through shaft 38 which in turn has been rotated clockwise by the engagement of external gears 39 with the internal gear rack 23 of Figure 3. The transmission of this rotation through gears 39 to 68 and to engage pinion gear 69 is effected as the carriage moves in counterclockwise direction as viewed in Figure 5. The net effect of movement is to rotate gear 70 and its related sprocket 57 at speeds equal to movement of the carriage element in the circuit and at coordinated speeds shaft to shaft. As the carriage structure moves counterclockwise in the circuit and as the sprocket roll 57 rotates clockwise, teeth 58 engaging perforations of a web at point of tangency, each tooth will become substantially stationary with respect to the device as a whole as a circumference portion of sprocket roll 57, on which tooth 58 is located, passes through tangency with a picture plane, and that portion of web lying in the picture plane will also remain substantially stationary with respect to the device as a whole.

A draw link stud 71 is fixedly engaged in connecting carriage link 55 and projects inwardly of the walls 13 of the frame structure. The purpose of this stud 71 is to prevent outward movement of roller chain 34 due to non-axial pull as it moves vertically of the driving of the structure. See Figures 3, 10 and 10a. This tendency is caused by non-axial pull from the nearest working tooth 31 of drive sprocket 30. It is essential to counteract this tendency to shift because otherwise draw link 36 and roller chain 34 and the elements thereof would foul elements of the supporting chain structure which moves adjacent to the roller chain 34 and in the same direction.

Extending around the circuit defined by shoulders 17, 18 and 19 and making a connection with shafts 44 and carriage support shafts is a support chain consisting of shafts 44 joined to one another and to carriage shafts by links 42, all outer support shafts except carriage shafts 52, 38, 57 and 61 are similar in structure to the aforementioned shafts 44 and similarly joined. These shafts carry a series of rollers 45 free to turn on the shafts 44. At the lateral extremities of these shafts are rollers 46 secured to the shafts 44 by conventional washers and cotter pins. These rollers are designed to run in recessed guides 17 longitudinally and arcuately of the frame structure.

The shaft 39 of pay-out roll 50 has small rollers 52 secured at ends by washer and cotter pin. These maintain the shaft in a predetermined circuit during movement as they ride in recessed guides 18 on either side of the device. Sprocket roll 57 likewise has rollers 67 at its extremities. Thus, rollers 67 guide the shaft in a circuit defined by recesses 19 and shaft 56 of sprocket roll 57 rides in tandem with shaft 38 of pay-out roll 50.

As shown in Figures 9 and 11 the web 75 carrying a series of graphic representations 77 consists of an endless loop of thin sheet material such as a plastic film. This sheet may vary in thickness from .003 to .005 of an inch and has parallel to and adjacent its extremities, a series of perforations 76 extending the entire endless loop of the web. Longitudinal extremities of the web are spliced in any conventional manner after the web has been conveniently threaded into the carriage and support structures.

A large portion of the web is placed within the confines of the inner chain and link elements. See Figure 11. In effect, when positioned for operation, the web passes over idler roll 53 and between pay-out roll 50 and the idler roll 53. Further increments of the web are supported by rollers 45. Shoulders 51 of pay-out roll 50 serve as a guide for the web and prevent fouling of the web with support elements.

Upon reaching the other jointure of the carriage element, as at 63, the web passes over and spaced apart from leading roll 63 to sprocket roll 57 wherein perforations 76 of the web are engaged by sprocket teeth 58 at point of tangencey. Actual linear travel of roll 57 is slightly less than the linear travel of carriage structure so that the portion of the web which lies in the picture plane is not affected by creep of the web over the sprocket roll 53. That portion of the web which creates the fold is therefore maintained substantially stationary with respect to the device as a whole. This is effected by the selected transmission of rotation from gear 39 through shaft 38 and gear 68 on the same shaft 38, idler 69 to gear 70 and roller 57. This entire gear train is disposed outwardly of carriage links 48, 49 and 55.

In order that roller 57 may gather only that portion of the web disposed in the arcuate section of guide channels as it passes therethrough and to prevent longitudinal motion of the web, the pitch diameter of the arcuate sections of internal gear racks 23 is diminished. The diameter is diminished according to the difference between a semi-circle drawn around tangent circumferences of support rolls and carriage rolls disposed in arcuate section and, a straight line tangent to outer circumference of support rolls similarly disposed. The latter straight lines define a circuit made by the supported web.

The web being so engaged in operation passes around sprocket roll 57 between web guide 65 and roll 57. As the gathering occurs, the web is engaged by idler roll 61 and is movably retained in position by the arcuate shield 64 shown in Figure 5. Arcuate idler shield 64 is secured at its ends to elbow links 55 by any suitable means such as welding. This shield prevents fouling of web with moving linkage elements and serves to guide the web for non-flapping distribution in the interior of the device. From these carriage elements the web moves inwardly of the carriage elements and moving linkage structure, into the interior of the enclosure formed by carriage and support structures wherein it is disposed at random between walls formed by support rollers and carriage element until subsequently further drawn by pay-out roll 50 to pay-out idler roll 53.

The web 75 has, in addition, a series of graphic representations A, B, C, D and E embossed on one surface thereof. The representations embossed on the web are of dimensions equal to those of an opening created by frame structure elements 12 and 14, respectively in the housing. The graphic representations are furthermore spaced longitudinally of the web with center-to-center distances equal to one-half of the shortest distance circuit outside of carriage and support structures whereon the fold is supported, and each representation has its center equidistant from side edges of the web. These graphic representations are carried on the outside surface of the web defined by rolls 45 and carriage rolls 50 and 57, respectively, points of tangency of outer rolls preferably defining a relatively level plane or gradual curved surface so that adjacent sub-surfaces of the web fold may be constantly in moving contiguous engagement with the rolls. The number of representations embossed on a single web will vary in accordance with a predetermined relation and desired effect.

The minimum number of graphic representations is three; the maximum number is dependent upon the length of web 75 which may be satisfactorily handled in enclosure formed by carriage and support structures. Referring to representations as frames for purposes of clarity, in a three frame web loop the frame sequence, in direction of sprocket roll 57 travels around loop, may be C, A, B or B, A, C not shown in drawings. In a five frame web loop the frame sequence may be A, C, E, B, D; E, C, A, D, B; B, D, A, C, E or D, B, E, C, A, as shown in Figure 9. Web 75, then, is an endless loop carrying odd numbers of frames A, B, C, D, E labeled in order of presentation under structure opening and arranged on loop, in direction of travel of sprocket roll 57 around loop, groups of odd lettered frames being followed by all even lettered frame groups, and groups of frames being arranged in descending alphabetical order.

As the carriage structure moves counterclockwise through a straight section of its circuit, the result of the movement registry means is that one frame A on portion of web 75 lying in the picture plane is progressively removed from the picture plane while another frame B is progressively disclosed within the borders which had been occupied by removed portions of the preceding frames C, D, and E. At all times during operation of the device those portions of frames on portions of web 75 then lying in the picture plane remain stationary with reference to the device as a whole.

When this operation occurs on the front side of the device the frames involved are disclosed through opening in frame housing 10. Those portions of the web 75 which are passing around circumference of sprocket roll 57 and of pay-out roll 50 are concealed from view by a concealing strip 78. This strip 78 is removably united to the carriage element by screw means 79 through the outer surface of link 48. Travel of concealing strip 78, from top to bottom of frame opening in Figure 1, is the only motion visible on the exterior of the device. The effect presented to an observer is that a single frame remains continuously in position behind the opening and that this frame is progressively and repeatedly altered by passage over it of concealing strip 78. Maintenance of one or more elements of relationship between succeeding frames, as of color, area of color or of value, line, and, or text, contributes to the impression of continuity accompanied by change.

To accomplish removal of web 75 from the frame, the entire device is placed on its back plate 15, and the carriage structure positioned near the center of the front straight section of the circuit. The entire frame structure 10 is removed from flat base element 15 thereby providing access to the interior carriage elements and interior base frame structure. Longitudinal angular covers 21 are removed by withdrawal of the securing screws 22 from the longitudinal supports 16, thereby providing access to working elements of the carriage structure. These angle sections 21 having been removed, concealing strip 78 is thereafter withdrawn by unseating screws 79 from the strip and carriage links. From the interior of the enclosure formed by the carriage and support structures a free loop of web 75 is pulled over roll 50. The linkage between bushings 47 of shaft 38 of roll 50 and shaft of sprocket roll 57 is broken by unseating of screws 81 and removal of half bearings 80 within linkage element 48 (see Figures 7 and 8). Linkage elements 48 and sprocket roll 57 are moved away from roll 50, in the direction of their normal travel, by lifting elements of the support structure, consisting of shafts 44, rollers 45 and 46 and linkage plates 42, upward from the longitudinal supports 16. Thus an opening into the interior of the carriage and support structure is effected, access being provided through the space found between sprocket roll 57 and pay-out roll 50. At this time web 75 may be cut transversely through a blank portion of the web. Free ends of web 75 may thereafter be pulled inwardly over sprocket roll 57 and pay-out roll 50 so that the entire web 75 lies unsupported in carriage and support structure enclosure. Now a single sheet having ends may be removed through the opening provided by sprocket roll 57 and pay-out idler 53.

Loading of the device may be accomplished by reversing the preceding steps. Prior to replacing angular covers 21, however, the ends of the web 75 should be spliced in a section not occupied by one of the frames 77. The entire web 75 should be drawn snugly around the carriage support structure, and one of the frames 77 must be positioned to register with the rectangular opening as shown in Figure 1. Angular sections 21 are thereafter replaced on the inner structure so that internal racks 23 mesh with the external gear element 39 of shaft 38 thereby placing the entire carriage element in position for operation.

Whereas this invention has been described in the foregoing specification and drawings in detail, it is to be considered that the invention is not limited by the foregoing, but rather the invention encompasses such modifications as may reasonably inure from the scope of the appended claims.

I claim:

1. A method for display of a series of graphic representations disposed on an endless flexible web comprising the steps of shaping a portion of the web into the form of an enclosure and shaping the remaining portion of the web into the form of a free loop disposed within said enclosure portion of the web, and progressing said free loop portion about the enclosure portion by progressively drawing increments of the web from said enclosure portion into said free loop portion at one end of the free loop and progressively adding equal increments of the web from said free loop portion to said enclosure portion at the other end of the free loop, whereby said free loop in its travel about the enclosure portion across a display window creates a preferred eliding illusion.

2. A display device comprising in combination, a base frame for a picture bearing web, a flexible display web endless in structure, means within the frame supporting a portion of the web in loop form, said means including a series of connected web supporting elements adapted to movably engage the web while maintaining said portion of the web in loop form, a continuous travel movable carriage flexibly joined to the web supporting means for withdrawing and simultaneously paying out equal increments of the web, means for transferring driving power from a source to said carriage element, driving means, and means within the said base frame for bearing extensions of both carriage elements and web supports.

3. A display device comprising in combination, a base frame for a picture bearing web, a flexible display web endless in structure, means within the frame including a series of connected web supporting elements adapted to movably engage the web and maintain a portion of the web in loop form, a continuous travel movable carriage flexibly joined to the web supporting means for withdrawing and simultaneously paying out equal increments of the web, a flexible transfer unit substantially conforming to the web loop, an attachment joining the transfer unit and the series of web supporting elements, said attachment being adapted to transfer driving power from a source to said carriage and said supporting means, driving means and means within said base frame for bearing extensions both in carriage and the web supporting means.

4. A display device of the character described comprising, in combination, a housing having a display window, a flexible display web endless in structure, web supporting means in said housing adapted to support a portion of the web in the form of a supported loop, loop forming means joined to the web supporting means maintaining the remainder of said web in the form of a free loop disposed within said supported loop, continuous travel means moving said loop forming means and said supporting means progressively along said web to cause successive portions of the web to progressively constitute said free loop, wherein said loop forming means passes across said display window in its travel along said web, so that said loop forming means may cause a portion of the web outside of said free loop to remain stationary as said free loop forming means is progressed along said web, driving means and transfer means for transferring drive and moving said web supporting means in unison with said loop forming means and in moving supporting relation to the stationary portion of the web.

5. A display device as set forth in claim 4 in which the said web supporting means includes two spaced articulated endless bands positioned in parallel planes toward opposite sides of the housing and a series of spaced, a line-roll conveyor extending between and carried by said articulated bands to move therewith.

6. A display device as set forth in claim 4 in which said continuous travel loop forming means includes a rotatable pay out roll engaging the web at the rear end of said free loop and a gathering roll engaging the web at the forward end of said free loop considered in relation to the direction of travel of said loop forming means, and a pair of pinions disposed toward each side of the housing and having driving connection with said gathering roll, and said means for moving said loop forming means including two spaced endless racks positioned in parallel planes toward opposite sides of the housing and in mesh with with said respective pinions, whereby as said loop forming means is moved along the web said gathering roller is rotated in web gathering direction.

7. A display device as set forth in claim 4 in which the said web supporting means includes two spaced articulated endless bands positioned in parallel planes toward opposite sides of the housing and a series of spaced, parallel web supporting rods extending between and carried by said articulated bands to move therewith, and said means for moving said loop forming means includes two spaced chains positioned adjacent and parallel with said articulated bands respectively, means for driving said chains, and means connecting said chains and said bands to rotate the chains and bands in their respective closed paths in unison.

8. A display device comprising in combination, a housing having a display window, an endless display web, a web pay out roll, a web gathering roll parallel with and proximate to said pay out roll, movable roll supporting means supporting said rolls in said relation and to move therewith in a closed path which passes across said window, operating means engaging and adapted to move said movable roll supporting means and said rolls supported thereon in said closed path, web supporting means journalled in said movable roll supporting means to move therewith including a series of spaced web supporting elements disposed in said closed path and movable in said path as said web supporting means moves with said roll supporting means, said supporting elements being adapted to move relatively to a stationary portion of a web that is supported on said elements, and said pay out roll and said gathering roll being respectively adapted to pay out and add to a loop of web disposed interiorly of said rolls and which web loop is unitary with the opposite ends of that portion of the web that is stationary as the loop is carried around said closed circuit by said rolls.

9. A display device comprising in combination, a housing having a display window, an endless display web, a pair of endless carriers, line-roller conveyor means movably supporting said carriers respectively in positions spaced sidewise from the opposite sides of said window to move in a closed path in a plane normal to the plane of the window, means attached to the conveyor for driving said carriers to move in said paths in unison, a continuous travel carriage mounted on each carrier to travel therewith in said closed path, loop forming mechanism connected to and supported by both of said carriages and movable therewith and including a pay out roll and a gathering roll both extending between said carriages, means responsive to the movement of said carriers and carriages in said closed path for actuating said mechanism to rotate said rolls, said line-roller conveyor being adapted to support that portion of an endless web which extends in said closed path between said pay out roll and said gathering roll with the remaining portion of the web extending between said rolls interiorly in said housing in the form of an internal loop, whereby as said carriers and said carriages and said mechanism move in said closed path the pay out roll pays out web from said interior loop and said gathering roll adds web to said interior loop, both at the same rate as the rate of travel of said carriages in their closed paths, that portion of the web which is disposed in said closed path between said rolls remaining stationary.

WILLIAM H. van BENSCHOTEN.

References Cited in the file of this patent

UNITED STATES PATENTS

| Number | Name | Date |
|---|---|---|
| 974,035 | Heard | Nov. 8, 1910 |
| 1,894,960 | Morrison | June 24, 1933 |
| 2,099,281 | Shaw | Nov. 16, 1937 |
| 2,363,725 | Graham | Nov. 28, 1944 |

FOREIGN PATENTS

| Number | Country | Date |
|---|---|---|
| 290,381 | Great Britain | May 17, 1928 |